United States Patent

Lund

[11] Patent Number: 6,152,706
[45] Date of Patent: Nov. 28, 2000

[54] PNEUMATIC PUMP AND CONTROL MEANS THEREFOR

[76] Inventor: Gustav Andrew Lund, 3323 W. Dahlia Dr., Phoenix, Ariz. 85029

[21] Appl. No.: 08/887,014

[22] Filed: Jul. 2, 1997

Related U.S. Application Data

[63] Continuation of application No. 08/675,593, Jul. 3, 1996, abandoned.

[51] Int. Cl.[7] ............................ F04B 17/00; F04B 39/10; F16K 31/12
[52] U.S. Cl. .......................... 417/399; 417/401; 417/403; 417/555.1; 251/59
[58] Field of Search ................................... 417/403, 401, 417/552, 555.1, 399; 251/59

[56] References Cited

U.S. PATENT DOCUMENTS

| | | | |
|---|---|---|---|
| 1,253,311 | 1/1918 | Visel | 251/59 |
| 1,981,507 | 7/1934 | Harris et al. | 417/399 |
| 2,081,510 | 5/1937 | Smart | 251/59 |
| 2,143,733 | 1/1939 | Hillis | 184/7 |
| 2,387,234 | 10/1945 | Clapp | 251/59 |
| 3,853,431 | 12/1974 | Goodhart | 417/403 |
| 4,123,204 | 10/1978 | Scholle | 417/393 |
| 4,305,531 | 12/1981 | Dooley et al. | 222/334 |
| 4,438,872 | 3/1984 | Dooley et al. | 222/217 |
| 4,878,815 | 11/1989 | Stachowiak | 417/63 |
| 4,895,497 | 1/1990 | Schlinkheider | 417/403 |
| 5,044,254 | 9/1991 | Miller et al. | 91/277 |
| 5,092,746 | 3/1992 | Henke | 417/403 |
| 5,173,036 | 12/1992 | Fladby | 417/403 |

*Primary Examiner*—Timothy S. Thorpe
*Assistant Examiner*—Michael K. Gray
*Attorney, Agent, or Firm*—Richard R. Mybeck; Peter B. Scull

[57] ABSTRACT

A pneumatically operated reciprocating pump and pneumatic control means therefor having in separate chambers a geared air flow control mechanism and a piston/piston rod sub-assembly. The geared air flow control mechanism has two toothed gear members, the first being quasi-circular with upper and lower fins and the second being semi-circular and having two sealing members and fins attached thereto. The gear members are mounted in tooth meshing relationship within a gear chamber disposed above the piston chamber. Two sealable passages connect the gear chamber to the piston chamber, one passage communicating directly with that portion of the piston chamber above the piston and the other communicating by means of an external tube system with that portion of the piston chamber beneath the piston. The gear having the two sealing members attached thereto is disposed so that each sealing member will alternately properly seal a corresponding sealable passage when the gear is sufficiently rotated thereto.

14 Claims, 3 Drawing Sheets

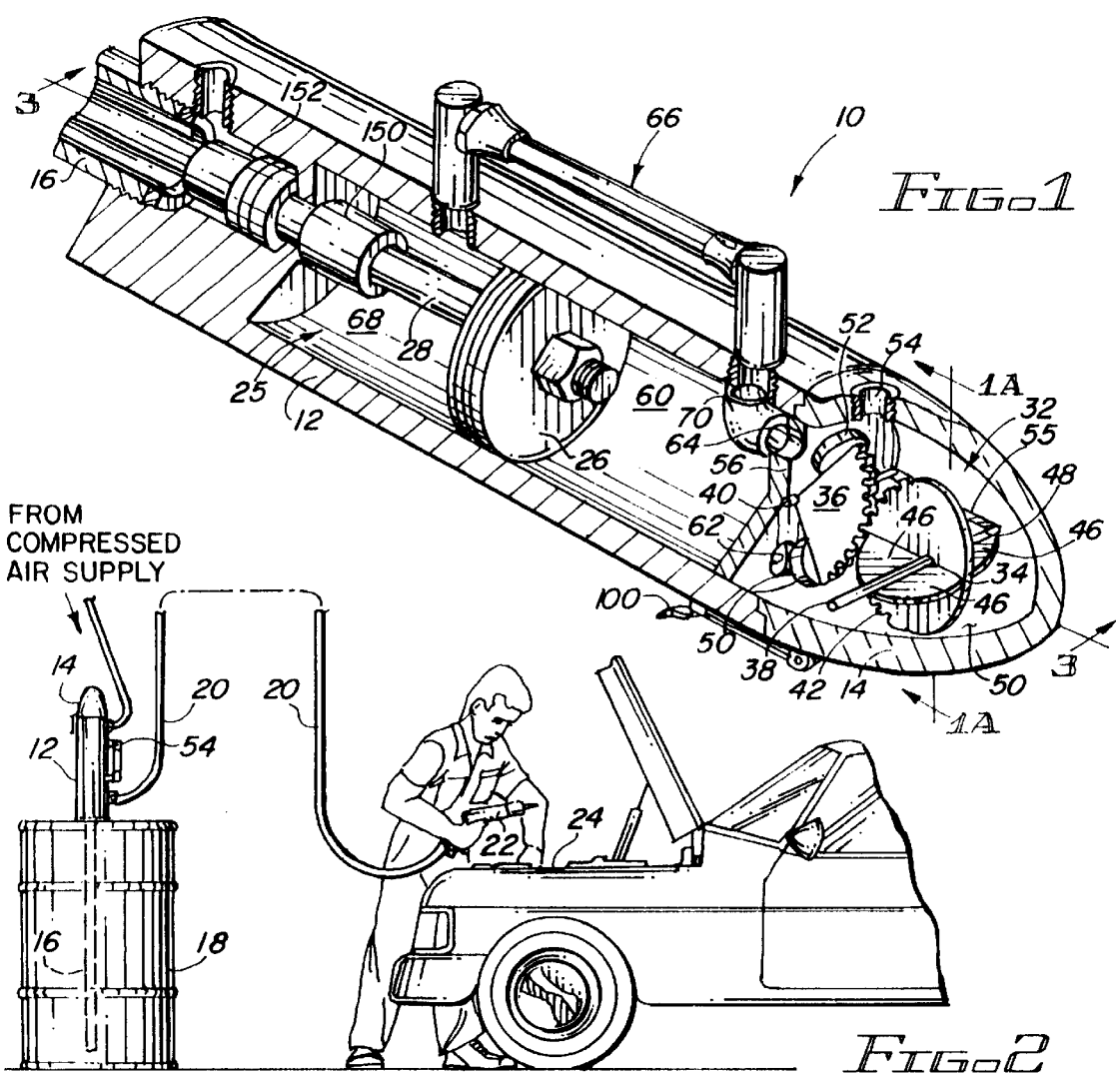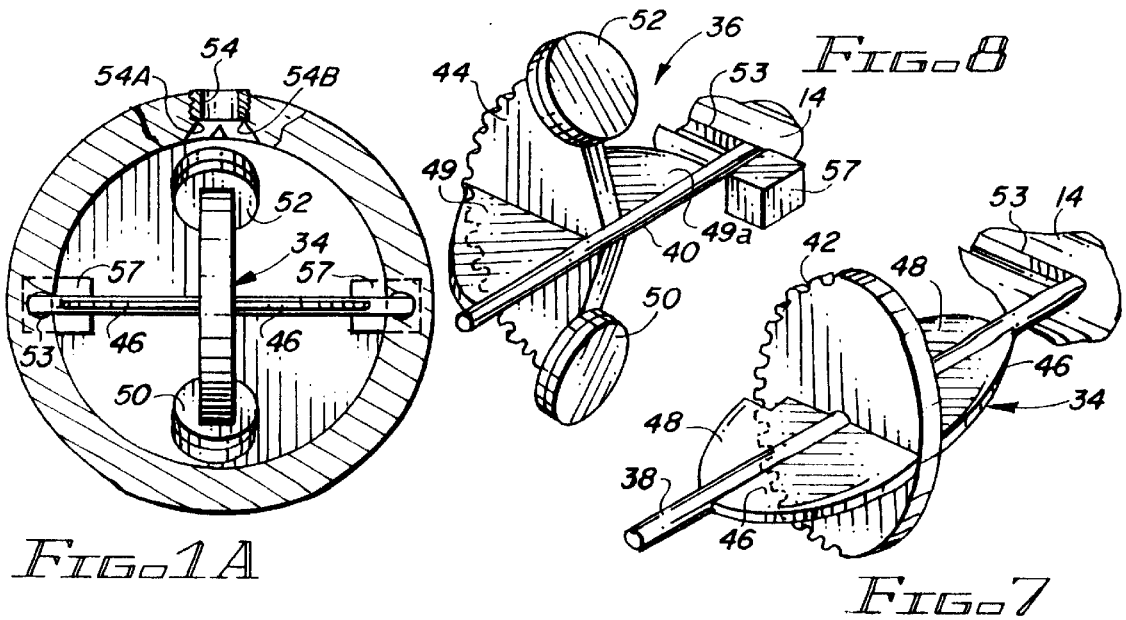

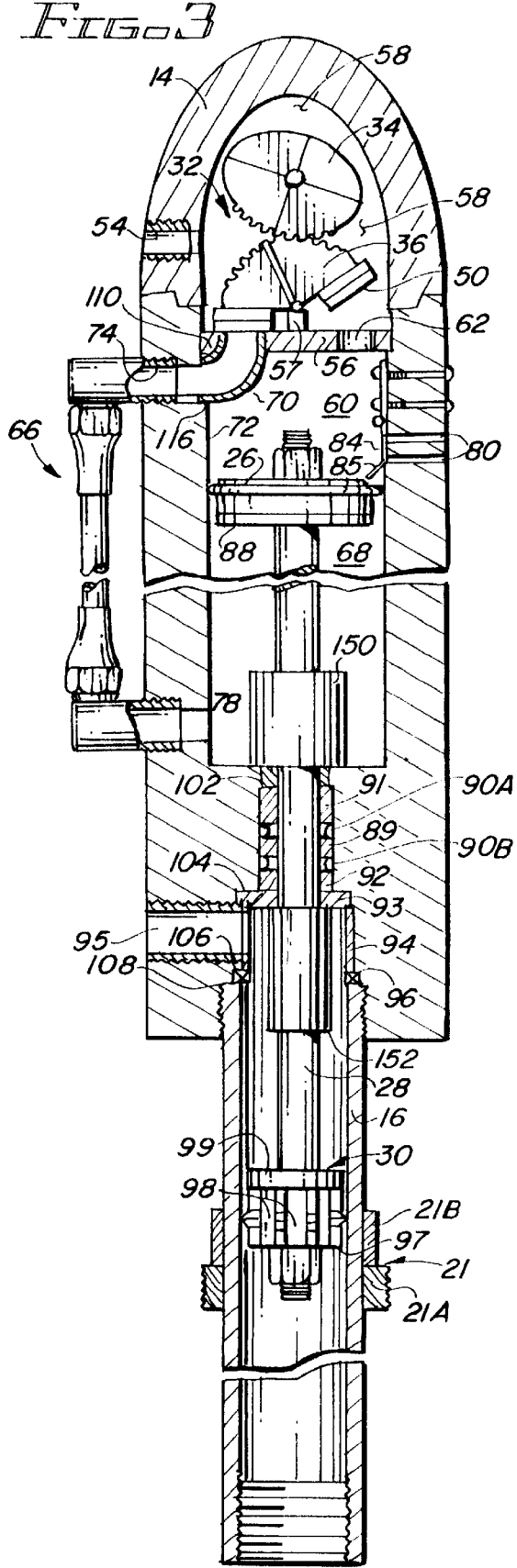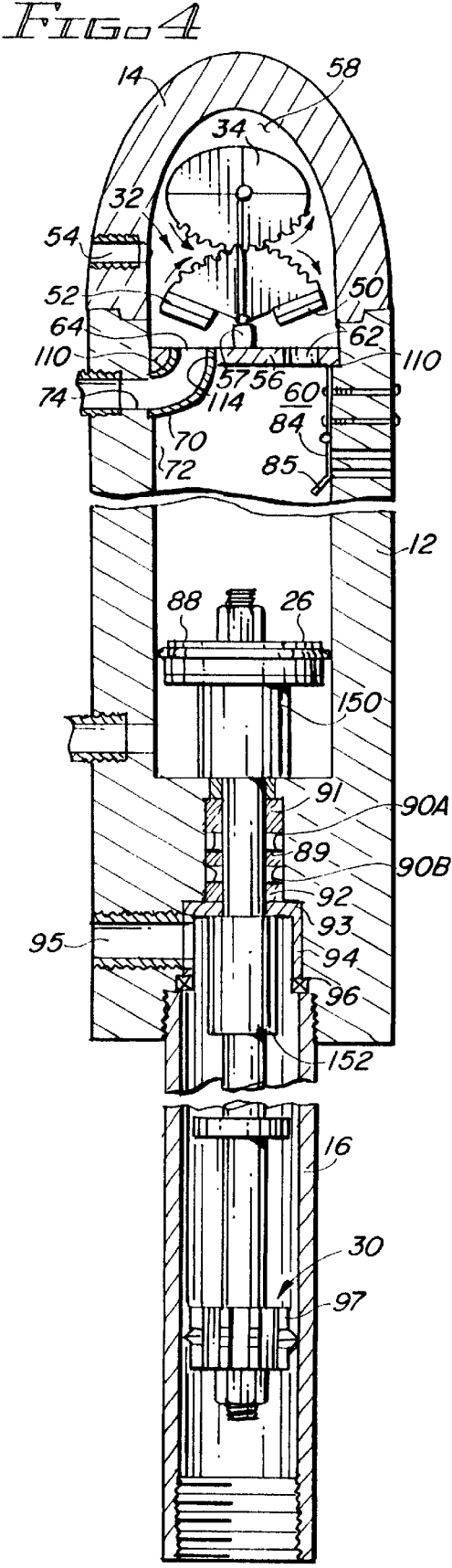

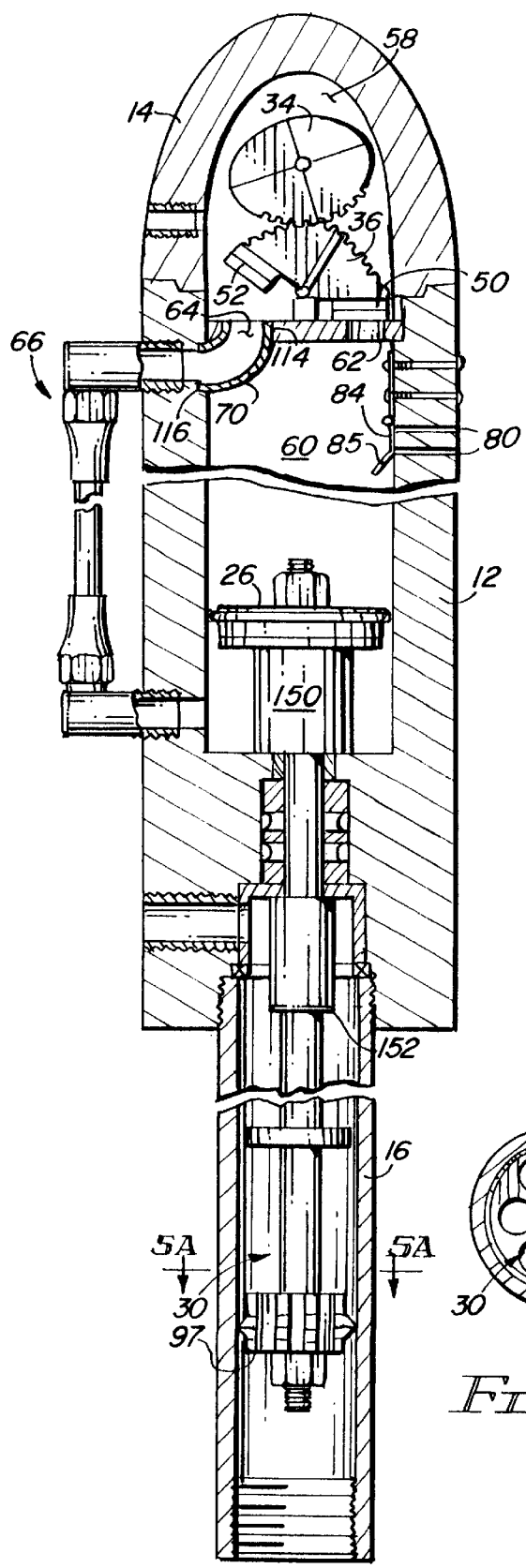
FIG. 5
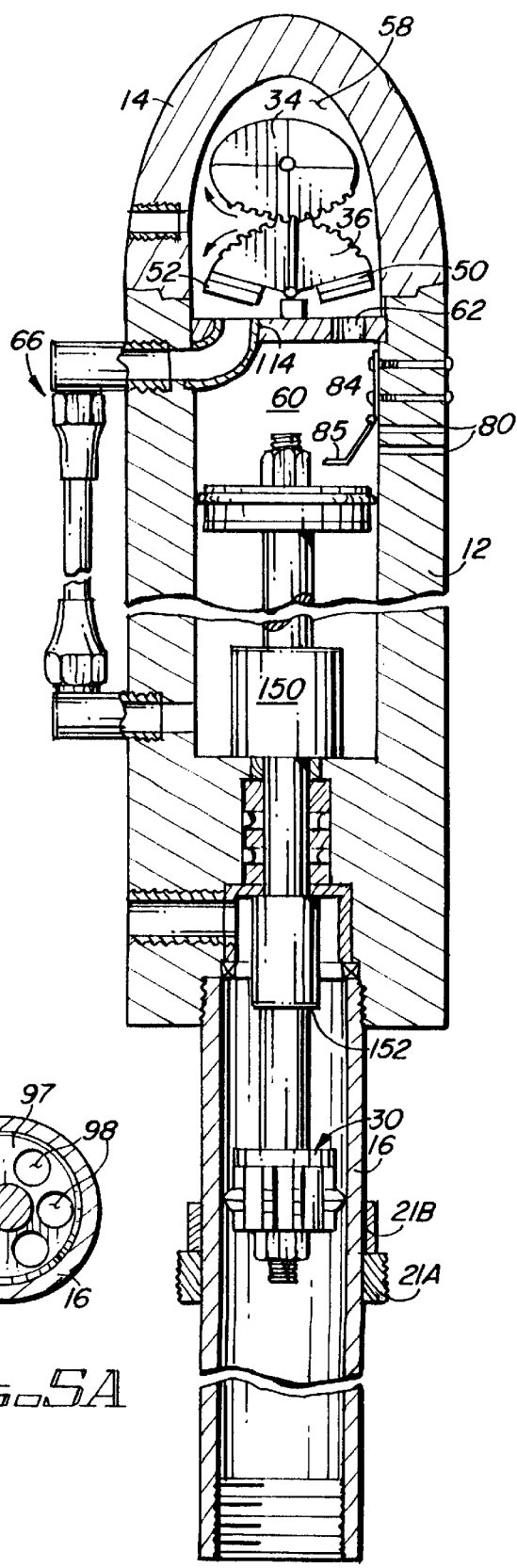
FIG. 6
FIG. 5A

PNEUMATIC PUMP AND CONTROL MEANS THEREFOR

This application is a continuation of U.S. patent application Ser. No. 08/675,593 filed Jul. 3, 1996 for PNEUMATIC PUMP AND CONTROL MEANS THEREFOR, now abandoned.

INTRODUCTION

The present invention relates generally to pneumatic pumps and more particularly to a pneumatic lubricant pump and the control of the flow of air therethrough.

BACKGROUND OF THE INVENTION

In the field of fluid pumps generally, compressed air continues to be a popular means for driving the reciprocating motion of a pump piston. Usually, this involves a piston tube in which the piston is moved back and forth in response to alternating streams of inrushing compressed air. In particular, air is forced to flow into the tube first on one side of the piston thus driving the piston in one direction. Then, at a preselected point, the first flow of air is halted, and a second flow is initiated on the opposite side of the piston which forces the piston to move back in the direction from whence the piston originally came. Then, when the piston is moved sufficiently in this second direction, the second flow is halted and a third flow is commenced which is identical in origin and action to the first flow to push the piston the same direction as the first flow did. As above, the third flow is ultimately halted and a fourth, identical to the second, is started. This cycle is then repeated over and over to reciprocate the piston and thereby drive the desired quantity of fluid, such as a lubricant, through the system to its preselected delivery point. A foot valve may be used to effectuate the actual movement of the fluid through the pump. Such a foot valve is connected to the piston rod and thus moves therewith in response to the alternating air flows in the piston tube. A typical foot valve assemblage is described in the preferred embodiment below.

A common concern with respect to pneumatically operated pumps has involved the control of the alternating air flows in and out of the piston tube to drive the piston back and forth. Many prior art devices have made use of sliding members to effect the desired control of air flow into the respective chambers on either side of the piston. Examples of such prior art devices include those in current production by the Alemite Corporation, Charlotte, N.C. Further, increasingly complex sliding (and the like) controls are disclosed in Hillis, U.S. Pat. No. 2,143,733; Scholle, U.S. Pat. No. 4,123,204; Dooley et al., U.S. Pat. Nos. 4,305,531, and 4,438,872; Stachowiak, U.S. Pat. No. 4,878,815; and Miller et al., U.S. Pat. No. 5,044,254.

In practice, such sliding control members suffer large amounts of friction due to the sliding contact and the requisite close tolerances necessary to seal the respective chambers. This friction causes a great deal of wear and tear on the sliding control members which, as a result, have relatively short use lives. Thus, there remains a need for means and methods to alternately seal and unseal the pneumatic chambers of such pumps in a fashion which will provide for extended part lives. It is toward this desideratum that the present invention is primarily directed.

BRIEF SUMMARY OF THE INVENTION

The present invention generally involves pneumatically controlled reciprocating fluid pumps and relates more particularly to such pneumatic pumps which have geared air flow control mechanisms. Such a control mechanism has two toothed gears, one being quasi-circular with air fins attached thereto while the second is semi-circular and has two sealing members and fins attached thereto. The gear members are mounted in tooth meshing disposition within a gear chamber disposed above the piston chamber. Two sealable passages connect the gear chamber to the piston chamber. One sealable passage communicates directly with that portion of the piston chamber above the piston while the other is connected by means of an external tube system to that portion of the piston chamber below the piston. The gear member which has the two sealing members attached thereto is disposed so that each sealing member will alternately seal one or the other of the respective passages when the gear is sufficiently rotated to close that passage corresponding to the active sealing member. Thus, except during transition, only one passage will be effectively open at any given time.

In operation, compressed air, which is constantly fed into the gear chamber, will effectively flow into and through alternately one passage and then the other passage. This forces the piston alternately one way and then the other, thus reciprocatingly driving the piston rod which carries the foot valve. The foot valve then repeatedly captures and moves more and more fluid out of the pump into the delivery conduit. In this fashion, fluid, such as motor oil, may be delivered from an oil drum or like reservoir directly to a desired delivery point such as an automobile crankcase.

It may thus be understood that the principal object of the present invention is to provide an improved reciprocating pneumatic pump having a long wearing mechanism for controlling and directing air flow therethrough while delivering fluid from a reservoir to a delivery point.

Another object of the present invention is to provide a novel non-sliding mechanism for controlling air flow through a reciprocating piston driven device.

A still further object of the present invention is the provision of novel air-intake means for selectively delivering air first to the proximal and thereafter to the distal face of a piston to reciprocate the piston relative to its housing member.

These and still further objects as shall hereinafter appear are readily fulfilled by the present invention in a remarkably unexpected manner as will be readily discerned from the following detailed description of an exemplary embodiment thereof especially when read in conjunction with the accompanying drawings in which like parts bear like numerals throughout the several views.

BRIEF DESCRIPTION OF THE DRAWINGS

In the drawings:

FIG. 1 is a cut-away isometric view of a reciprocating pump device embodying the present invention;

FIG. 1A is a cross-sectional view taken on line 1A—1A of FIG. 1;

FIG. 2 is a side elevation of the reciprocating pump device of the present invention being used in an automotive lubricating system;

FIG. 3 is a broken, cross-sectional view of the device of FIG. 1 taken on line 3—3 thereof;

FIG. 4 is another broken, cross-sectional view taken along line 3—3 of FIG. 1 showing the piston in another position in response to the action of the geared flow control mechanism;

FIG. 5 is yet another broken, cross-sectional view taken along line 3—3 of in FIG. 1 showing the completed movement of the geared flow control mechanism;

FIG. 5A is a cross-sectional view taken along line 5A—5A of FIG. 5;

FIG. 6 is still another broken cross-sectional view taken along line 3—3 of FIG. 1 showing the piston and geared flow control mechanism returned to the FIG. 3 position;

FIG. 7 is an isometric view of the upper gear of the flow control mechanism; and FIG. 8 is an isometric view of the lower gear of the flow control mechanism.

DESCRIPTION OF THE PREFERRED EMBODIMENT

The present invention involves a pneumatic reciprocating pump which is identified in the attached drawings by the general reference numeral 10. As shown in FIG. 1 for example, pump 10 generally includes a main piston housing or tube 12, a cap section 14 (housing 12 and cap 14 are the primary constituents in what is commonly known as an "air motor") and a lubricant tube 16 which, as shown in FIG. 2, is insertable in a lubricant storage drum or barrel 18. In one very useful application of pump 10, a fluid such as motor oil or the like, is pumped from storage barrel 18 through a hose 20 to and upon demand through a lubricant gun 22 for delivery into the crankcase of an automobile 24, a generally understood service for automobiles. As shown in FIGS. 3 and 6, a standard bung adaptor 21 is firmly attached to the exterior surface of down tube or lubricant tube 16 to provide a standard sealable connection to barrel 18.

As particularly shown in FIGS. 1 and 3–6, pneumatic pump 10 comprises a reciprocating assembly 25 which includes a piston 26 attached to a piston rod 28 to which is attached a foot valve 30. (See FIGS. 3–6). Piston 26 is pneumatically driven as will be described in more detail below.

Pneumatic flow for driving piston 26 is generally controlled by control means 32 which includes a upper gear member 34 and a lower gear member 36, each of which being rotatably mountable in cap section 14. Each gear member 34, 36 (as shown in more detail in FIGS. 7 and 8) comprises an axle 38, 40, respectively, having respective toothed portions 42, 44 attached thereto. Toothed portion 42 of gear member 34 is disposed perpendicular to axle 38 and is quasi-circular (i.e. circular or modified circular as, for example shown in FIGS. 3–6 in oblongated form). Upper gear 34 also has attached thereto fins 46, 48 (upper and lower, respectively) each of which being disposed substantially perpendicularly to toothed portion 42. Fins 46, 48 are attached to axle 38 and toothed portion 42 of gear 32. Toothed portion 44 of lower gear 36 is similarly disposed perpendicularly to its axle 40 and is semi-circular in shape, preferably presenting less than a full half circle. Attached to opposite ends of toothed portion 44 are sealing pads 50, 52 which are used to close off air flow as will be described below. Lower gear 36 also preferably has a set of fins 49, 49A attached thereto as shown best in FIG. 8. Note, the terms upper and lower are used here only to facilitate reference to the drawings (particularly FIGS. 3–6) and are not intended to limit the orientation of the invention in anyway.

Cap section 14 is preferably bullet-shaped and has an air inlet 54 disposed on one side thereof. Preferably, inlet 54 is, as shown in FIG. 1A, provided with two sub-passages 54A and 54B, each of which being angled about 20° off center. This angled offset provides for air ingress into cap section 14 such that the air does not directly impinge on the toothed portion 42 of gear member 34 but will rather be directed to impinge on fins 46, 48.

A pair of slots 53 are defined inside cap section 14 for retaining the ends of axles 38, 40 therein. Portions of one slot 53 are shown in FIGS. 1, 7 and 8, and both slots 53 are shown, in cross-section, in FIG. 1A.

A dividing plate 56 is disposed between the interior chamber 58 of cap section 14 and the interior chamber 60 (above piston 26) of piston tube 12. Dividing plate 56 preferably has two support blocks or keys 57 (See FIG. 1A) disposed thereon to support the respective ends of axle 40 of lower gear 36. Support blocks 57 maintain axle 40 a predefined distance above the surface of dividing plate 56. Blocks 57 are disposed immediately below the ends of axle 40. The upper opening of piston housing 12 has two notches formed therein to receive blocks 57.

Dividing plate 56 also has two apertures 62, 64 defined therethrough. Aperture 62 functions to provide direct communication between chamber 58 and chamber 60 (above piston 26) whereas aperture 64 functions to provide communication between chamber 58 and chamber 68 (below piston 26) by means of bypass tube system 66. In one practice, bypass system 66 is in communication with and/or includes elbow member 70 disposed inside piston tube or housing 12. Elbow 70 is connected at one end to dividing plate 56 to encompass aperture 64 defined therethrough, and at its other end, elbow member 70 is connected to wall 72 of piston housing 12 and is in operative relationship to aperture 74 which extends through wall 72. The exterior portion of tube system 66 (preferably comprising two elbows and a tube hermetically sealed together) is attached at one end to the exterior of wall 72 in communication with aperture 74. The other end of tube system 66 is attached to the exterior of wall 72 in operative communication with aperture 78 formed through wall 72. Aperture 78 is positioned below the lowermost operable position available to piston 26 so that aperture 78 communicates with chamber 68 beneath piston 26.

The selective air flow through apertures 62, 64 in dividing plate 56 is directly governed by lower gear 36 which is forced to alternately seal off first one and then the other aperture 62, 64. Sealing pads 50, 52 are disposed to each effect these alternate seals of apertures 62, 64. Further specifics regarding the process of controlling air flow will be addressed below.

Air exit flow from piston tube 12 is governed by one set 80 of exit holes (See FIGS. 3–6); which is disposed above the operative range of piston 26. Set 80, disposed above piston 26, provides communication between chamber 60 and the atmosphere. Hinged sealing member 84, is provided with a lip 85, which is disposed to appropriately maintain a sealed, no-flow position or an open, exit flow position as will be described below.

Piston 26 has a gasket or other effective sealing member 88 disposed thereon to prevent communication between chambers 60 and 68 in tube 12. Gasket 88 is of a type generally known in the art so that piston 26 can be reciprocated within tube 12. A set of packings 90A, 90B provides a seal around rod 28 to seal off chamber 68 from tube 16 while rod 28 reciprocates axially therein. Packings 90 are of a type which are also generally known. A brass washer 89 may be disposed between packings 90A, 90B as shown in FIGS. 3–6.

Preferably, packings 90A, 90B are fixed in place by a stepped brass collar (or bushing) 91 disposed above packing 90A, and by two steel washers 92, 93 disposed immediately below 90B. Immediately below washers 92, 93 is a cylindrical spacer 94 with a hole defined therethrough which corresponds with a fluid outlet 95. A hose 20 or like delivery means may be attached to outlet 95 for dispensing the fluid to be pumped by device 10. Yet one more steel washer 96 is disposed below spacer 94 and is immediately above the threaded connection of tube 16 to piston housing 12. The lower portion of housing 12, in which packings 90 and related components are disposed, is preferably specially pre-formed to properly contain these members. More specifically, the lower portion of tube 12 contains an interior step 102 which correspondingly meets with the stepped portion of brass collar 91. Moreover, this lower portion of housing 12 also preferably has two further stepped portions 104 and 106 corresponding, at 104, to the different outside diameters of washers 92 and 93 and, at 106, to the different outside diameters of spacer 94 and washer 96. These pre-formed steps, appropriately placed, provide for a constant, pre-selected pressure on packings 90. Packings 90 will thus unalterably provide the pre-designed seal around rod 28 without premature leakage or excess wear. The transition area 108 immediately below washer 96 may also be stepped or may be formed to properly contain an O-ring (not shown) and/or may merely be threaded up to the point where tube 16 meets with washer 96 so that downtube 16 bears immediately thereagainst.

A foot valve 30 is attached to rod 28 below packings 90 and performs the actual movement of fluid through tube 16 up to and through outlet 95. Foot valve 30 generally comprises a slidable spacer 99 which rides on rod 28 above a gasketed foot member 97. Foot member 97 has several holes 98 defined therethrough which allow communication between the chambers in tube 16 defined respectively above and below foot member 97. Thus, when piston rod 28 moves foot member 97 down through the fluid to be pumped, fluid flows up through holes 98 and thus forces spacer 99 to ride up rod 28. Some of this fluid also flows around the edges of spacer 99 to fill the chamber above foot member 97. Then, when rod 28 moves upward and carries foot member 97 up through the fluid, spacer 99 rides down rod 28 come to rest on foot member 97 and effectively seal off holes 98. Thus, fluid trapped above spacer 99 is moved upward in tube 16 and then ultimately out of tube 16 through outlet 95.

Two substantially cylindrical stop members 150 and 152 are preferably disposed on and around rod 28. Stop member 150 is disposed to stop the downward movement of plunger 26 and stop member 152 is disposed to stop the upward movement of foot member 97.

Pump 10 is generally made from standard pump materials, preferably involving metal parts and rubber or similar sealing/packaging materials. Preferably, aluminum, brass, copper and/or stainless steel parts are used to avoid corrosion. Depending on the material to be pumped, standard down tube and foot valve materials are intended to be used. Thus, with the use of standard materials the forming of the various parts will be performed using understood processes. Note, all sealing members packings, (gaskets and the like), screws and nuts are commonly available. All other parts are either available or simply manufacturable from similar existing parts and/or from stock materials using known processes.

Assembly of the several parts will also be performed using generally understood technology. For example, threaded connections will be employed in the preferred embodiment except as will hereafter be described. Blue LOCTITE® may be used to seal the threaded and other part connections. Bung adaptor 21 is preferably welded in place on the exterior surface of down tube 16. Hinged sealing members 84, 86 are preferably bolted with common lock nuts in place as shown in FIGS. 3–6. Small portions of packing material (not shown) are also preferably superglued to the underside of sealing member 84, to provide a close fit seal against the interior surface of tube 12 covering exit holes 80, respectively. These small portions of packing material are also ground slightly to present a curved surface to correspondingly meet the curvilinear interior surface of tube 12. Note, superglue may also be used to attach sealing members 50, 52 (which also may be formed from known packing materials) to their appropriate locations on gear member 36.

During assembly, piston rod 28 is the first main component to be installed in housing 12. Preferably with either piston 26 or foot valve 30 pre-attached thereto, rod 28 is inserted into housing 12. Note, packings 90 and the various collars, washers, and spacers (89, 91, 92, 93, 94, and 96) are simultaneously therewith or preliminarily thereto inserted into their appropriate positions. If foot valve 30 is pre-attached to rod 28, then rod 28 is inserted upward into housing 12 and then piston 26 would be attached to rod 28 after this insertion. If piston 26 is preattached, then rod 28 is inserted from the top down into housing 12. Then, foot valve 30 would be attached to the lower end of rod 28. Either way, downtube 16 would then be firmly screwed in place over foot valve 30 at this point.

Pump piston 26 and foot valve 30 are generally formed according to known processes in the art. In the preferred embodiment, however, these each are generally made from two metallic washers, one each above and below a gasket (packing) member with a smaller washer disposed inside the gasket and between the above and below washers. All three washers thus coact to maintain the proper design pressure on the gaskets such that they properly seal against the interior surfaces of the piston tube 12 and the down tube 16, respectively. This proper seal pressure prevents against the gasket deforming improperly if insufficiently held in place which would cause leaks. Proper (non-excessive) upper and lower washer pressure against the gaskets also prevents premature/excess wear. Further, in the assembly of reciprocating assembly 25, piston rod 28 is preferably identically shouldered and threaded at each end so as to properly accept either piston 26 or foot valve 30 at either end. This provides for simplicity in manufacturing as well as in maintenance; a user can alternately place these gasketed members at alternate ends to improve wear (e.g. at friction points such as where packings 90 abut rod 28). In providing shouldered ends, it is preferred that the outside diameter of the body portion of rod 28 is larger than the outside diameters of the threaded end portions of rod 28. This way, the piston and foot valve can be made to rest against the "shoulders" and be adequately held fast by standard locknuts.

Next in the overall assembly process, elbow member 70, and dividing plate 56 are preferably set in operable position within the upper open mouth of housing 12 and gear members 34, 36 are likewise set in their proper dispositions within cap member 14 so that all four of these members will be secured in proper operative relationship when cap member 14 is secured to housing 12. The preferred form for securing cap 14 to housing 12 involves using two exterior suitcase-type buckles or latches such as latch 100 shown in FIG. 1. Preferred latches are the VANTAGE-DOWNUNDER™ Rod style latches with a secondary catch (stocked by Southco., Inc.) Thus, when cap member 14 is buckled in place on housing 12, the ends of axle 40 of gear member 36 are made to contact and, essentially rest upon the upper support surfaces of support blocks 57 on dividing plate 56. The word "operable" when used in connection with axles 38 and 40 means that they are rotatable while also enabling the mating teeth of gears 34, 36 to mesh properly without imposing excessive stress or friction problems thereon.

Preferred manufacturing parameters provide a situation in which few, if any, sealing materials need to be used particularly in the attachment of cap section 14 to piston housing 12. This greatly simplifies the maintenance features of these pumps. Specifically, the time necessary to break the present pump 10 down to check and/or replace gaskets (such as gasket 88 on piston 26) is greatly reduced. Moreover, rebuilding time is also greatly reduced over that necessary for prior devices.

Some of the preferred parameters which contribute to the above-described success include the close tolerance fits of cap 14 to housing 12 (note, for example, the approximate 10° chamfer fit therebetween particularly in FIGS. 3–6) as well as all the close fits between dividing plate 56, housing 12 and elbow 70. For example, it is preferred that a cylindrical shoulder 110 be formed in the top portion of housing 12 to receive dividing plate 56 as shown in FIGS. 3–6. Moreover, dividing plate 56 should have an inverted cylindrical shoulder 112 formed on the underside of aperture 64 to correspond to the preferred shouldered shape 114 of elbow 70. Elbow 70 will also preferably have a shoulder 116 corresponding to aperture 74. Again, either elbow 70 or some packing material (not shown) attached thereto is formed in a curvilinear shape where elbow 70 abuts the curvilinear inner surface 72 of tube 12. Further, two keyholes (not shown) are preferably formed in the upper mouth of housing 12 to receive the corresponding separator blocks 57 on which the ends of axle 40 operably rest. Blocks 57 are preferably firmly attached to dividing plate 56.

Thus, when assembling pump 10, after piston 26 and all components disposed therebelow are properly assembled, elbow 70 and dividing plate 56 are put snugly in place and then cap member 14, with gears 34, 36 properly assembled therein, is latched onto housing 12 with axle 40 operably bearing on blocks 57 as described to hold all of these flow control parts in proper operating position.

In order to attach a pump 10 to a standard oil barrel 18, down tube 16 is inserted in the opened barrel bung hole and the threaded portion 21A of standard bung adaptor 21 is threaded into the corresponding threaded bung portion on barrel 18. A conventional hex head wrench may then be used to engage the upper hexagonal portion 21B of adaptor 21 which is then properly rotated to tighten the engagement of bung adaptor 21 with barrel 18. For standard oil drums, a 2 inch diameter thread 21A will be used. Pump 10 is now ready for use.

A description of the operation of a pump 10 will now be set forth with particular reference to FIGS. 3–6. As shown in FIG. 3, piston 26 is in the full forward, or up position. This piston position was chosen arbitrarily as the starting position for this description. As will be described in more detail below, after piston 26 reaches the full up position shown in FIG. 3, gear members 34, 36 will be rotated to the positions shown in FIG. 3 to leave aperture 62 in dividing plate 56 in unsealed open position. Thus, compressed air from an outside source (not shown) will flow through inlet 54 into and through chamber 58, down through aperture 62 and into chamber 60 to push piston 26 downward in tube 12. As piston 26 moves downward, it moves air trapped in chamber 68 downward also. The downward moving air in chamber 68 flows to the external tube system 66 through aperture 78 thus providing for egress of air from chamber 68. This allows piston 26 to proceed downward without air hindrance in chamber 68.

Then, when piston 26 reaches the full down position as shown in FIG. 4, gear members 34, 36 are caused to rotate in the direction shown by the arrows in FIG. 4 to open aperture 64 and ultimately (as shown in FIG. 5) close aperture 62. The physical causes for this rotation will be discussed below. The opening of aperture 64 allows for air to flow, as can be seen in FIG. 5, from chamber 58 through elbow 70 through external tube system 66 down to and through aperture 78 and then into chamber 68. This air flowing into chamber 68 pushes up on piston 26. The air pushing up on piston 26 causes it to move upward in tube 12. This upward movement moves the air in chamber 60 upward as well. The upward moving air catches lip 85 of door 84 and pushes door 84 open. Air in chamber 60 then escapes to the atmosphere through apertures 80. Piston 26 is then pushed to the full up position shown in FIG. 6. As is also shown in FIG. 6, when piston 26 reaches the up position, gear members 34, 36 are rotated so that aperture 62 will then be open. Then, this process starts over and the cycle continues, as desired.

The physical causes involved in initiating and completing the rotations of gear members 34, 36 are not completely understood, but are believed to involve either or both pressure differentials and/or dynamic air flow phenomena. Specifically, it is believed that when piston 26 is moved up to the up position shown in FIG. 6, either the upward movement of air disposed in chamber 60 puts an upward force on sealing member 50 causing the rotation of gear 36 to begin; or, when piston 26 reaches the full up position shown in FIG. 6 and its motion is temporarily halted, preferably by stop member 152, the air pressure in chamber 68 quickly reaches equilibrium with that in chamber 58 in cap member 14. Once in equilibrium, air flow through tube system 66 essentially halts; however, the still generally higher pressure from (and/or the continued movement of air by) the outside source (not shown) urges further flow into chamber 58 through inlet 54. This higher source pressure (and/or continued flow) may then impose sufficient force against the upper fins 46 of gear member 34 and/or fins 49 of gear member 36, to cause the initiation of rotation of gear member 34 (as shown in FIG. 6) which, in turn, causes gear member 36 to turn sufficiently to unseal aperture 62. Also, with fins 49 disposed on gear member 36, gear member 36 may be urged to rotate by the flow of air into chamber 58 even without initiation by gear member 34. Either way, once unsealed, the higher pressure air will immediately flow through aperture 62 into chamber 60. The pressure in chamber 60 would (before aperture 62 is unsealed) be at or near atmospheric pressure due to having been exposed to the atmosphere when door 84 was open. The pressure in chamber 58 would be at or near the higher pressure of the external compressed air source connected to inlet 54. Air thus would rush into chamber 60 and start pushing piston 26 downward.

The cause of the opposite gear rotations when piston 26 reaches the lower end of housing 12 are believed to be similar. Either the flow of air up through tube system 66 caused by a downward moving piston pushes sealing member 52 up sufficiently to unseat it and thus initiate a downward flow through tube system 66; or, pressure equilibrium between chambers 58 and 60 is quickly achieved at the bottom of the piston 26 downstroke, when the plunger 26 comes to rest against stop 150, and air flow into chamber 60 is generally halted and the higher pressure air continuing to flow into chamber 58 from the outside source pushes the lower fins 48 of gear member 34 and/or fins 49 of gear member 36 which thereby causes a rotation of gear member 34 (as shown in FIG. 4) and/or drives gear member 36 sufficiently so that sealing member 52 is unseated from aperture 64 and air flow is again initiated down into elbow 70, tube system 66, and into chamber 68 to push piston 26 upwards.

The flow of fluid up through down tube 16 is generally as is known in the art using known foot valve mechanisms such as the one shown in the attached drawings and identified by the general reference numeral 30. Foot valve 30 moves up and down with rod 28; foot member 97 being fixedly attached to rod 28 and spacer 99 being slidably attached thereto. Fluid flows up through apertures 98 when foot member 97 is moved downward through the fluid by rod 28 and piston 26. Spacer 99 is pushed upward on piston rod 28 away from foot member 97 and fluid flows around the edges of spacer 99. Then, on the upstroke caused by piston 26 being moved by compressed air flowing into chamber 68, foot member 97 is pulled up and spacer 99 comes into contact therewith closing off apertures 98. Fluid then trapped on top of spacer 99 is forced upward and out of outlet 95. This fluid then flows through hose 20 which is connected to outlet 95. Again, as shown for example in FIG. 2, the fluid flowing through hose 20 flows to a dispenser 22 to be dispensed in known fashion.

The preferred embodiment is shown and described generally as being used in an automotive lubrication dispensing system; however, it is understood that other fluids in other fluid dispensing systems may also be dispensed by a pump embodying the present invention. For example and not by way of limitation, it is believed that the present invention can be used to pump other kinds of automotive fluids (transmission fluid, anti-freeze, windshield wiper fluid, and the like) as well as beverages (water, soda, beer, etc.), pool conditioning chemicals, pest and weed control chemicals, and/or water or other fluids as the need arises.

Moreover, it should also be understood that other pneumatic piston driven systems could make use of the "air motor" aspects (principally, cap 14, housing 12 and the main features disposed therein including air flow control means 32, piston 26 and piston rod 28) of the present invention. Thus, the power of reciprocating piston 26 and piston rod 28 controlled by means 32 can be harnessed in ways other than by merely the pumping of fluids. Piston driven rods, links, cranks and/or shafts may also take advantage of the present air "change" mechanism to create rotary or rotating shaft energy.

From the foregoing, it is readily apparent that a new and useful embodiment of the present invention has been herein described and illustrated which fulfills all of the aforestated objects in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly, what is claimed is:

1. a pneumatically controlled reciprocating pump comprising a piston chamber having a piston and piston rod sub-assembly mounted therein; a gear chamber in superposition to said piston chamber and having a geared air flow control mechanism mounted therein; said geared air flow control mechanism having first and second gear members, said first gear member having upper and lower fins attached thereto and said second gear member having two sealing members and a first adjacent fin and a second adjacent fin attached thereto, said gear members being rotatably mounted in tooth engaging relationship to each other in said gear chamber; said gear chamber being communicatively connected to said piston chamber by two sealable passages disposed therebetween, the first one of said two sealable passages communicating directly with that portion of said piston chamber disposed above said piston, and the second one of said two sealable passages being connected by a separate air flow means to that portion of the piston chamber disposed beneath said piston whereby said geared air flow control mechanism acts to alternately seal the first or the second of said sealable passages in response to the rotation of said first and second gear members and thereby control the reciprocation of said piston within said piston chamber.

2. A pneumatically controlled reciprocating pump according to claim 1 in which said gear chamber is defined inside a cap member which is detachably attachable to a piston tube in which said piston chamber is defined.

3. A pneumatically controlled reciprocating pump according to claim 2 in which the detachable attachment of said cap member to said piston tube is accomplished through use of at least one latch.

4. A pneumatically controlled reciprocating pump according to claim 2 in which said cap member is bullet shaped.

5. A pneumatically controlled reciprocating pump according to claim 2 in which said cap member has first and second slots defined therein on the interior thereof for operably retaining said first and second gear members.

6. A pneumatically controlled reciprocating pump according to claim 5 in which said first and second gear members each have an axle having first and second ends; said first ends of said axles being rotatably mounted in said first slot in said cap member and said second ends of said axles being rotatably mounted in said second slot in said cap member.

7. A pneumatically controlled reciprocating pump according to claim 1 which further comprises a downtube which is operably connected to and disposed below said piston chamber, said downtube having a first opening adjacent the bottom end thereof for receiving fluid to be pumped and a second opening adjacent the top end thereof for dispensing fluid pumped thereto.

8. A pneumatically controlled reciprocating pump according to claim 7 which further comprises a foot valve disposed within said downtube and attached to said piston rod sub-assembly.

9. A rotatable air flow control mechanism in a pneumatically operated driven device comprising:

flow means for allowing compressed air to flow into an air flow control chamber in which said rotatable air flow control mechanism is operably mounted;

said flow means comprising a first gear member having upper and lower fins and a second gear member having a first adjacent fin and a second adjacent fin;

said first gear member being responsive to the inflow of said compressed air on said upper and said lower fin;

whereby said rotatable air flow control mechanism is caused to rotate in a first direction and thereby open a first passage to a piston chamber so that compressed air may flow thereinto to move a piston disposed therein: and said second gear member being responsive to the inflow of said compressed air on said first and second adjacent fins;

whereby said rotatable air flow control mechanism is caused to rotate in a second direction and thereby close said first passage and open a second passage to said piston chamber so that compressed air may flow thereto to move the piston.

10. A rotatable air flow control mechanism according to claim 9 further comprising a first sealing means for sealing said first passage and a second sealing means for sealing said second passage.

11. A rotatable air flow control mechanism according to claim 10 in which said first sealing means for sealing said first passage comprises a first sealing pad attached to said first gear member and said second sealing means for sealing said second passage comprises a second sealing pad attached to a second gear member.

12. A rotatable air flow control mechanism according to claim 10 in which said air flow control chamber is defined inside a cap member which is detachably attachable to a piston tube in which said piston chamber is defined.

13. A pneumatically controlled reciprocating pump according to claim 9 which further comprises a downtube which is operably connected to and disposed below said piston chamber, said downtube having a first opening adjacent the bottom end thereof for second opening adjacent the top receiving fluid to be pumped and a second opening adjacent the top end thereof for dispensing fluid pumped thereto.

14. A pneumatically controlled reciprocating pump according to claim 13 which further comprises a foot valve disposed within said down tube.

* * * * *